United States Patent
Takimoto et al.

(10) Patent No.: US 11,131,594 B2
(45) Date of Patent: Sep. 28, 2021

(54) PRESSURE SENSOR WITH A POTENTIAL ADJUSTMENT MEMBER

(71) Applicant: Saginomiya Seisakusho, Inc., Tokyo (JP)

(72) Inventors: Kazuya Takimoto, Sayama (JP); Kazunori Hirai, Tokorozawa (JP); Kazushige Suzuki, Tokorozawa (JP)

(73) Assignee: SAGINOMIYA SEISAKUSHO, INC., Tokyo (JP)

( * ) Notice: Subject to any disclaimer, the term of this patent is extended or adjusted under 35 U.S.C. 154(b) by 133 days.

(21) Appl. No.: 16/500,038

(22) PCT Filed: Mar. 9, 2018

(86) PCT No.: PCT/JP2018/009220
§ 371 (c)(1),
(2) Date: Oct. 1, 2019

(87) PCT Pub. No.: WO2018/186107
PCT Pub. Date: Nov. 10, 2018

(65) Prior Publication Data
US 2020/0182724 A1 Jun. 11, 2020

(30) Foreign Application Priority Data
Apr. 7, 2017 (JP) .............................. JP2017-076906

(51) Int. Cl.
*G01L 9/00* (2006.01)
*G01L 19/06* (2006.01)
*G01L 19/14* (2006.01)

(52) U.S. Cl.
CPC ............ *G01L 9/0054* (2013.01); *G01L 19/06* (2013.01); *G01L 19/14* (2013.01)

(58) Field of Classification Search
None
See application file for complete search history.

(56) References Cited

U.S. PATENT DOCUMENTS 10,514,314 B2 * 12/2019 Takimoto .............. G01L 19/069

FOREIGN PATENT DOCUMENTS

JP 2003-302300 A 10/2003
JP 3987386 B2 7/2007
(Continued)

OTHER PUBLICATIONS

European Search Report dated May 19, 2020, issued in European Application No. 18781515.4.
(Continued)

*Primary Examiner* — Andre J Allen
*Assistant Examiner* — Jermaine L Jenkins
(74) *Attorney, Agent, or Firm* — Workman Nydegger (57) ABSTRACT

A pressure sensor includes a diaphragm made of metal and configured to separate a pressure chamber from a liquid seal chamber, a housing made of metal and disposed around the liquid seal chamber, a pressure detection element disposed in the liquid seal chamber in a liquid . . . sealable manner to detect the pressure of the fluid, and a potential adjustment member disposed between the pressure detection element and each of the diaphragm and the housing and being conductive, the potential adjustment member being connected to a zero potential terminal of the pressure detection element, wherein a distance between the potential adjustment member and each of the diaphragm and the housing is larger than a predetermined insulating distance.

9 Claims, 6 Drawing Sheets

(56) References Cited

FOREIGN PATENT DOCUMENTS

WO     WO-2009087767 A1 *    7/2009    ......... G01L 19/0061
WO        2015/194105 A1     12/2015

OTHER PUBLICATIONS

International Search Report dated Apr. 3, 2018, issued in PCT Application No. PCT/JP2018/009220, filed Mar. 9, 2018.
International Preliminary Report on Patentability dated Oct. 17, 2019, issued in PCT Application No. PCT/JP2018/009220, filed Mar. 9, 2018.
Office Action received in Japanese Application No. 2017-076906, dated Jan. 28, 2019.

* cited by examiner

PRESSURE SENSOR WITH A POTENTIAL ADJUSTMENT MEMBER

TECHNICAL FIELD

The present invention relates to a pressure sensor, and in particular, to a pressure sensor detecting a pressure using a pressure detection element disposed in a liquid seal chamber.

BACKGROUND ART

Pressure sensors are used for various applications as refrigerant pressure sensors for refrigeration, cool storage, and air conditioners, water pressure sensors for water supply and industrial pumps, and the like, steam pressure sensors for steam boilers, pneumatic/hydraulic sensors for pneumatic/hydraulic industrial equipment, pressure sensors for automobiles, and the like.

Among these pressure sensors, as a pressure sensor for detection of fluid pressure, for example, a liquid seal type pressure sensor has been known in which a pressure detection element such as a semiconductor pressure sensor chip is disposed in a liquid seal chamber filled with sealing oil as disclosed in PTL 1.

In a liquid seal type pressure sensor, a fluid pressure of a fluid in a pressure chamber acts on a diaphragm separating the pressure chamber from the liquid seal chamber and is transmitted to the pressure detection element via the sealing oil in the liquid seal member. The pressure detection element thus detects the fluid pressure of the fluid. A plurality of lead pins are connected to the pressure detection element via bonding wires, and the following are performed via the lead pins: power supply, transmission of a detected pressure signal, various adjustments, and the like. Furthermore, to protect the liquid seal chamber from environmental conditions such as humidity, dust, heat, and the like in air, insulating hermetic glass is fitted around the liquid seal chamber in a sealable manner, with the plurality of lead pins fixed by the hermetic glass. Additionally, a housing made of metal or the like is disposed around the hermetic glass in order to ensure strength.

CITATION LIST

Patent Literature

PTL 1: WO2015/194105
PTL 2: Japanese Patent No. 3987386

SUMMARY OF INVENTION

Technical Problem

However, in the liquid seal type pressure sensor as described above, an internal circuit in a semiconductor sensor chip is disadvantageously damaged by Electro-Static Discharge (ESD). To prevent such a problem, an ESD protect circuit may be integrated into the semiconductor sensor chip. However, recent downsizing of the semiconductor sensor chip has resulted in difficulty in providing a sufficient area of the ESD protect circuit, and integration of such a circuit leads to a skyrocketing unit price of the semiconductor sensor chip.

Furthermore, an invention is known in which, for prevention of such a problem, spaces between the housing and the lead pins is filled with an adhesive having a higher dielectric withstand voltage than the air to increase an electrostatic withstand voltage as is the case with the pressure sensor described in PTL 1. However, the invention described in PTL 1 is insufficient for preventing discharge around the semiconductor sensor chip.

Additionally, PTL 2 describes a known invention including, as a potential adjustment member, a conductive member disposed to cover the pressure detection element disposed in the liquid seal chamber, the conductive member being connected to a zero potential terminal of the pressure detection element to prevent adverse effects of a possible potential between a device frame ground and a secondary power supply.

However, in the invention described in PTL 2, in a case where distances between the potential adjustment member and the housing and between the potential adjustment member and the diaphragm are short during application of static electricity and during application of a withstand voltage, discharge may occur between the potential adjustment member and each of the housing and the diaphragm and damage the pressure detection element disposed inside the liquid seal chamber.

Thus, an object of the present invention is to provide a pressure sensor in which a potential adjustment member covering a pressure detection element disposed inside a liquid seal chamber has a modified shape to allow prevention of the pressure detection element from being damaged by discharge in a case of application of static electricity and in a case of application of a withstand voltage, with functions of the potential adjustment member unchanged.

Solution to Problem

To accomplish the object, a pressure sensor of the present invention includes a diaphragm made of metal and configured to separate a pressure chamber into which a fluid with a pressure thereof to be detected is introduced from a liquid seal chamber filled with sealing oil, a housing made of metal and disposed around the liquid seal chamber, a pressure detection element disposed in the liquid seal chamber in a liquid sealable manner to detect the pressure of the fluid via the diaphragm and the sealing oil, and a potential adjustment member disposed between the pressure detection element and each of the diaphragm and the housing and being conductive, the potential adjustment member being connected to a zero potential terminal of the pressure detection element, wherein a distance between the potential adjustment member and each of the diaphragm and the housing is larger than a predetermined insulating distance.

Furthermore, the predetermined insulating distance may be 0.6 mm or more.

Furthermore, the predetermined insulating distance may be 1.0 mm or more.

Furthermore, the potential adjustment member may be constituted of a frame made of metal and connected to the zero potential of the pressure detection element, and a shield plate made of metal and disposed between the diaphragm and the pressure detection element.

Furthermore, the frame is shaped to include a recessed component on the pressure chamber side, and the shield plate is shaped like a flat plate.

Furthermore, the frame is shaped to include a recessed component on the pressure chamber side, and the shield plate is shaped to include a recessed component on a side of the shield plate facing the pressure chamber.

Furthermore, the frame is shaped like a flat plate, and the shield plate is shaped to include a recessed component on a side of the shield plate facing the pressure chamber.

Furthermore, an outer periphery of the shield plate may be formed at or outward of the outer periphery of the frame.

Furthermore, the outer periphery of the shield plate may formed by half-punching-punching-out.

Furthermore, the frame may be fixed to hermetic glass disposed around the liquid seal chamber, and the frame and the shield plate may be connected together by welding so as to cover the pressure detection element disposed inside the liquid seal chamber.

Advantageous Effects of Invention

According to the pressure sensor of the present invention, the potential adjustment member covering the pressure detection element disposed inside the liquid seal chamber has the modified shape to allow prevention of the pressure detection element from being damaged by discharge in a case of application of static electricity and in a case of application of a withstand voltage, with functions of the potential adjustment member unchanged.

DESCRIPTION OF EMBODIMENTS

Embodiments of the present invention will be described below with reference to the drawings.

First, a structure of a conventional liquid seal type pressure sensor will be described.

Figure 1:
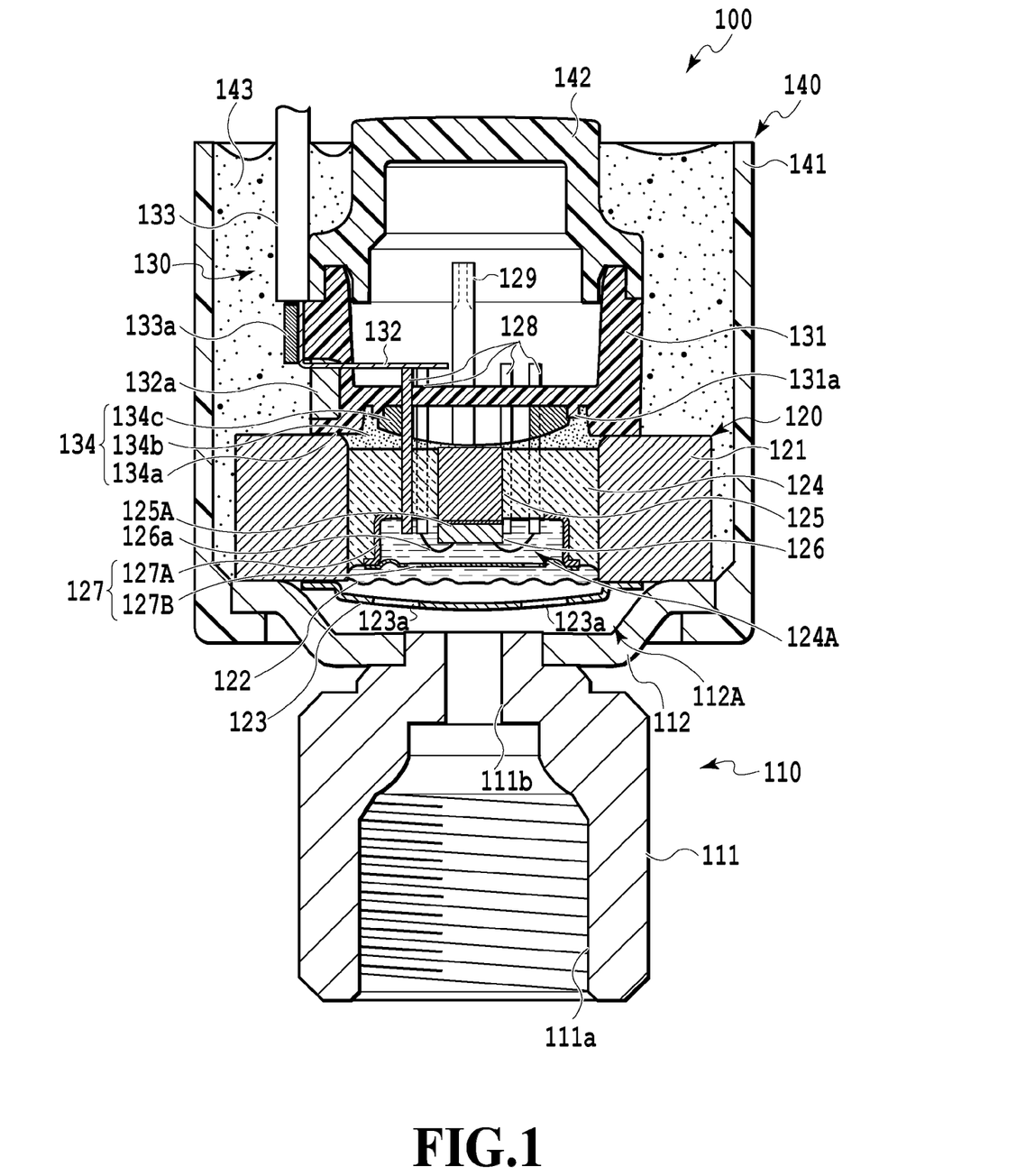
FIG. 1 is a vertical cross-sectional view illustrating an entire liquid seal type pressure sensor as an example of a conventional pressure sensor.

FIG. 1 is a vertical cross-sectional view illustrating an entire liquid seal type pressure sensor 100 as an example of a conventional pressure sensor.

In FIG. 1, the liquid seal pressure sensor 100 includes a fluid introduction component 110 introducing a fluid with a pressure thereof to be detected into a pressure chamber 112A described below, a pressure detection component 120 detecting the pressure of the fluid in the pressure chamber 112A, a signal transmission component 130 transmitting, to the outside, a pressure signal detected by the pressure detection component 120, and a cover member 140 covering the fluid introduction component 110, the pressure detection component 120, and the signal transmission component 130.

The fluid introduction component 110 includes a joint member 111 made of metal and connected to piping through which the fluid with the pressure thereof to be detected is guided, and a base plate 112 made of metal and shaped like a bowl, the base plate 112 being connected by welding or the like to an end of the joint member 111 that is different from the end connected to the piping.

The joint member 111 includes an internal thread component 111a threadably fitted around an external thread component of the connected portion of the piping, and a port 111b through which the fluid introduced through the piping is guided to the pressure chamber 112A. An opening end of the port 111b is connected to an opening formed in the center of the base plate 112 by welding or the like. Note that, here, the internal thread 111a is formed in the joint member 111 but that an external thread may be formed in the joint member 111 or that, instead of the joint member 111, a connection pipe made of copper may be connected to the piping. The base plate 112 is shaped like a bowl extending in a direction opposite to the joint member 111 and forms the pressure chamber 112A between the base plate 112 and a diaphragm 122 described below.

The pressure detection component 120 includes a housing 121 with a through-hole, the diaphragm 122 separating the above-described pressure chamber 112A from a liquid seal chamber 124A described below, a diaphragm protect cover 123 disposed on the pressure chamber 112A side with respect to the diaphragm 122, hermetic glass 124 set inside the through-hole in the housing 121, the liquid seal chamber 124A located between the diaphragm 122 and a recessed component of the hermetic glass 124 located on the pressure chamber 112A side, the liquid seal chamber 124A being filled with a pressure transmission medium such as silicone oil or a fluorine based inert liquid, a pillar 125 disposed in a through-hole in the center of the hermetic glass 124, a pressure detection element 126 supported by the pillar 125 and disposed inside the liquid seal chamber 124A, a potential adjustment member 127 disposed around the pressure detection element 126, a plurality of lead pins 128 fixed to the hermetic glass 124, and an oil filling pipe 129 fixed to the hermetic glass 124.

The housing 121 is formed of a metal material, for example, an Fe and Ni-based alloy or stainless steel in order to maintain the strength of periphery of the hermetic glass 124. Both the diaphragm 122 and the diaphragm protect cover 123 are formed of a metal material and welded together at an outer peripheral edge of the through-hole in the housing 121 located on the pressure chamber 112A side.

The diaphragm protect cover 123 is provided inside the pressure chamber 112A to protect the diaphragm 122 from water hammer and provided with a plurality of communication holes 123a through which a fluid introduced through the fluid introduction component 110 passes. After the pressure detection component 120 is assembled, the housing 121 is welded to an outer peripheral edge of the base plate 112 of the fluid introduction component 110 from the outside by TIG welding, plasma welding, laser welding, or the like.

The hermetic glass 124 is provided to protect, from surrounding environmental conditions such as humidity, dust, and heat, the liquid seal chamber 124A with the pressure detection element 126 disposed therein in a liquid sealable manner, and to hold the plurality of lead pins 128 to insulate the lead pins 128 from the housing 121. The pressure detection element 126 is located on the liquid seal chamber 124A side with respect to the pillar 125 disposed in the center of the hermetic glass 124 and is supported by an adhesive layer 125A and the like. Note that, in the present embodiment, the pillar 125 is formed of an Fe and Ni-based alloy but that the present embodiment is not limited to this and the pillar 125 may be formed of stainless steel or any other metal material. Furthermore, the pillar 125 may be omitted and the pressure detection element 126 may be supported directly on a flat surface forming the recessed component of the hermetic glass 124.

The pressure detection element 126 such as a semiconductor sensor chip internally includes the diaphragm consisting of a material having a piezoresistance effect, for example, single crystal silicon, a bridge circuit including a plurality of semiconductor strain gauges formed on the diagram and bridge-connected together, and an integrated circuit including an amplification circuit and an arithmetic processing circuit to process an output from the bridge circuit. Furthermore, the pressure detection element 126 is connected to the plurality of lead pins 128 by a bonding wire 126a made of gold or aluminum, and the plurality of lead pins 128 constitute external input/output terminals of the pressure detection element 126.

The fluid introduced through the piping is introduced through the joint member 111 into the pressure chamber 112A to push the diaphragm 122. The pressure applied to the diaphragm 122 is transmitted to the pressure detection element 126 via the sealing oil in the liquid seal chamber 124A. The pressure deforms the silicon diaphragm of the pressure detection element 126 and is converted into an electric signal by the bridge circuit based on piezoresistance elements. The electric signal is output from the integrated circuit in the pressure detection element 126 to the plurality of lead pins 128 via the bonding wire 126a.

The potential adjustment member 127 sets the pressure detection element 126 in a field-less (zero potential) state to prevent circuits and the like in the chip from being affected by a possible potential between frame ground and the secondary power supply as described in PTL 2. The potential adjustment member 127 is formed of a metal material and covers the liquid seal chamber 124A. The potential adjustment member 127 is constituted of a frame 127A fixed to the hermetic glass 124 and a shield plate 127B formed of a metal material and disposed between the pressure detection element 126 in the liquid seal chamber 124A and the diaphragm 122. The frame 127A and the shield plate 127B are fixed by a welding component 127a so as to cover the pressure detection element 126 disposed in the liquid seal chamber 124A. The potential adjustment member 127 is connected to the zero potential terminal of the pressure detection element 126.

The plurality of lead pins 128 and an oil filling pipe 129 are fixed to the hermetic glass 124 by hermetic treatment so as to penetrate the hermetic glass 124. In the present embodiment, a total of eight lead pins 128 are provided as the lead pins 128. That is, the lead pins 128 include three lead pins 128 for external input/output (Vout), for supply of a driving voltage (Vcc), and for grounding (GND) and five lead pins 128 serving as terminals for adjustment of the pressure detection element 126. Note that, in FIG. 1, four of the eight lead pins 128 are illustrated.

The oil filling pipe 129 is provided to fill the inside of the liquid seal chamber 124A with, for example, silicone oil or a fluorine-based inert liquid as a pressure transmission medium. Note that one end of the oil filling pipe 129 is squeezed and blocked after oil filling as illustrated by a dotted line in FIG. 1.

The signal transmission component 130 is provided opposite to the pressure chamber 112A of the pressure detection component 120, and includes a terminal block 131 in which the plurality of lead pins 128 are arranged, a plurality of connection terminals 132 fixed to the terminal block 131 with an adhesive 132a and connected to the plurality of lead pins 128, a plurality of electric wires 133 electrically connected to outer ends of the plurality of connection terminals 132 by welding or the like, and an electrostatic protect layer 134 located between an upper end of the housing 121 and the terminal block 131 and formed of a silicone-based adhesive. Note that the electrostatic protect layer 134 may be formed of an adhesive such as an epoxy resin.

The terminal block 131 is shaped generally like a cylinder including a guide wall located near a middle portion of the cylinder and through which the above-described plurality of lead pins 128 are guided. The terminal block 131 is formed of, for example, polybutylene terephthalate (PBT). The terminal block 131 is fixed to an upper portion of the housing 121 of the pressure detection component 120 with the adhesive included in the electrostatic protect layer 134.

The connection terminals 132 are formed of a metal material and fixed perpendicularly, with the adhesive 132a, to a portion of a cylinder sidewall located above the above-described guide wall. Note that, in the present embodiment, three connection terminals 132 are provided for external input/output (Vout), for supply of a driving voltage (Vcc), and for grounding (GND). Inner ends of the three connection terminals 132 are electrically connected to the corresponding lead pins 128 by welding or the like. However, the present embodiment is not limited to this connection method, and the connection may be achieved by any other method.

Furthermore, in the present embodiment, three electric wires 133 are provided for connection to the three connection terminals 132. Coating formed of polyvinyl chloride (PVC) or the like is peeled off from the electric wires 133, and resultant core wires 133a are preliminarily soldered and the stranded core wires are bundled. The core wires 133a are electrically connected to the connection terminals 132 by soldering, welding, or the like. However, the present embodiment is not limited to this connection method, and any other method may be used for the connection. Furthermore, the three electric wires 133 are drawn out from a cover member 140 covering the periphery of the pressure sensor 100, and bundled and covered with a protect tube (not illustrated) formed of polyvinyl chloride (PVC) or the like.

The electrostatic protect layer 134 is provided to improve electrostatic resistance of the pressure detection component 120 regardless of whether an ESD protect circuit is present or not. The electrostatic protect layer 134 is mainly constituted of an annular adhesive layer 134a applied to an upper end surface of the housing 121 so as to cover an upper end surface of the hermetic glass 124 and formed of a silicone-based adhesive, the adhesive layer 134a having a predetermined thickness, and a coating layer 134b coated all over the upper end surface of the hermetic glass 124 and consisting of a silicone-based adhesive. The terminal block 131 includes an annular protruding component 131a protruding toward the hermetic glass 124 and formed on an inner peripheral surface of the terminal block 131 that forms a cavity portion of the terminal block 131 and that faces the upper end surface of the hermetic glass 124. A protruding length of the annular protruding component 131a is set according to viscosity of the coating layer 134b or the like. The annular protruding component 131a thus formed pulls and holds, due to surface tension, a part of the applied coating layer 134b in a narrow space between the annular protruding component 131a and a portion of the inner peripheral surface of the terminal block 131 forming the cavity portion which portion is substantially orthogonal to the upper end surface of the hermetic glass 124. Thus, the coating layer 134b is applied without being concentrated on one side in the cavity portion of the terminal block 131. Furthermore, the coating layer 134b is formed on the upper end surface of the hermetic glass 124 to a predetermined thickness. However, as illustrated in FIG. 1 at a portion 134c, the coating layer 134b may be formed to further coat a part of each of the plurality of lead pins 128 protruding from the upper end surface of the hermetic glass 124.

The cover member 140 includes a waterproof case 141 shaped generally like a cylinder and covering the periphery of the pressure detection component 120 and the signal transmission component 130, a terminal block cap 142 placed on an upper portion of the terminal block 131, and a sealing agent 143 with which gaps between an inner peripheral surface of the waterproof case 141 and an outer peripheral surface of the housing 121 and an outer peripheral surface of the terminal block 131 are filled.

The terminal block cap 142 is formed of, for example, a resin material. In the present embodiment, the terminal block cap 142 is shaped to block the upper portion of the above-described cylindrical terminal block 131 and is placed on the upper portion of the terminal block 131 before the sensor is filled with a sealing agent 143 such as a urethane-based resin. However, the terminal block cap 142 is not limited to this shape but may be shaped to integrally block the upper portion of the terminal block 131 and an upper portion of the waterproof case 141 and placed after the sensor is filled with the sealing agent 143. Alternatively, a new lid member different from the terminal block cap 142 may be provided and placed on the upper portion of the waterproof case 141 after the terminal block cap 142 and the sealing agent 143 are placed in position.

The waterproof 141 is shaped generally like a cylinder and formed of a resin material, for example, polybutylene terephthalate (PBT). A lower end of the cylindrical shape is provided with a flange portion extending inward. The flange portion is in abutting contact with an outer peripheral portion of the base plate 112 of the fluid introduction component 110, to which the signal transmission component 130 and the pressure detection component 120 inserted through an opening in an upper portion of the waterproof case 141 are connected. In this state, the sensor is filled with the sealing agent 143 to fix internal components such as the pressure detection component 120.

Figure 2A:
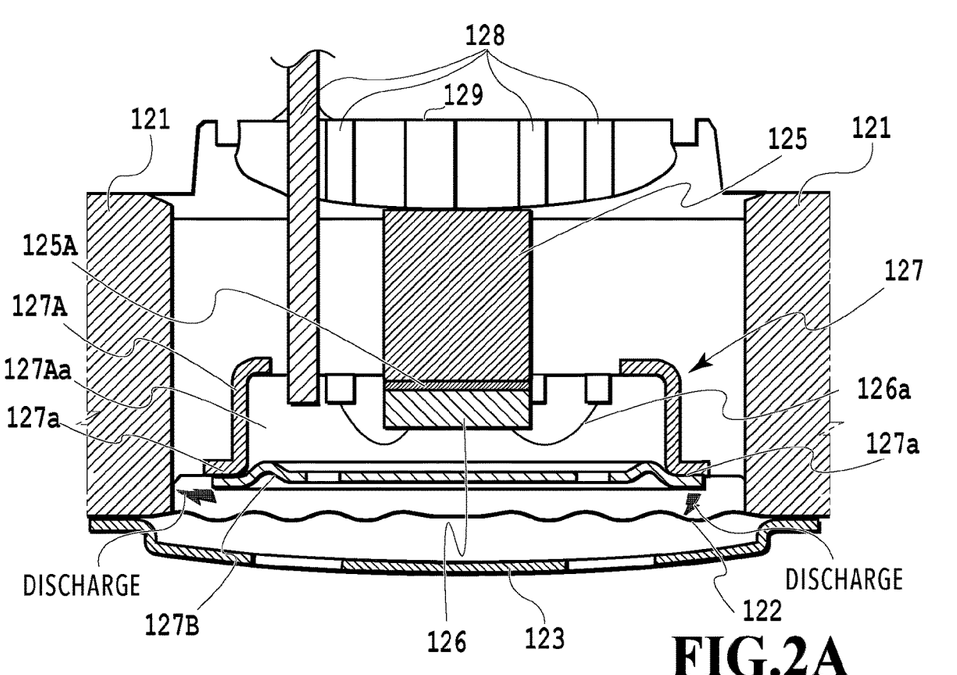
FIG. 2A is an enlarged vertical cross-sectional view illustrating a discharge area of the pressure sensor illustrated in FIG. 1.
Figure 2B:
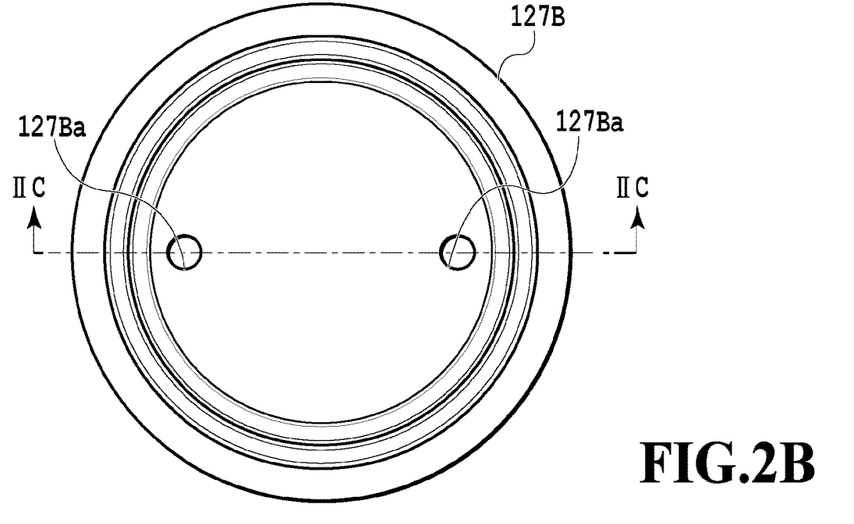
FIG. 2B is a plan view illustrated in FIG. 2A.
Figure 2C:
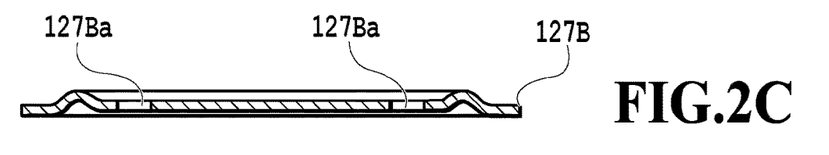
FIG. 2C is a cross-sectional view taken along line IIC-IIC illustrated in FIG. 2B.

FIG. 2A is an enlarged vertical cross-sectional view of a discharge area of the pressure sensor 100 illustrated in FIG. 1. FIG. 2B is a plan view of a shield plate 127B illustrated in FIG. 2A. FIG. 2C is a cross-sectional view taken along line IIC-IIC illustrated in FIG. 2B.

In FIG. 1 and FIGS. 2A to 2C, the potential adjustment member 127 is constituted of a frame 127A shaped to include a recessed component 127Aa on the pressure chamber 112A side as illustrated in FIG. 2A and a shield plate 127B shaped generally like a flat plate as illustrated in FIG. 2C. An outer periphery of the shield plate 127B is formed inward of an outer periphery of the frame 127A. Note that, as illustrated in FIG. 2B, the shield plate 127B is provided with two communication holes 127Ba through which the pressure transmission medium in the liquid seal chamber 124A passes but that the number of communication holes 127Ba is not limited to this and one or two or more communication holes may be formed.

As illustrated in FIG. 1 and FIGS. 2A to 2C, in a case where a distance between the housing 121 and the welding portion 127a at outer peripheries of the frame 127A and the shield plate 127B and a distance between the diaphragm 122 and the welding portion 127a at the outer peripheries of the frame 127A and the shield plate 127B are short, discharge may occur between these components in a case of application of static electricity and in a case of application of a withstand voltage, leading to damage to the pressure detection element 126 disposed inside the liquid seal chamber 124A.

Now, a first embodiment of the present invention will be described.

Figure 3A:
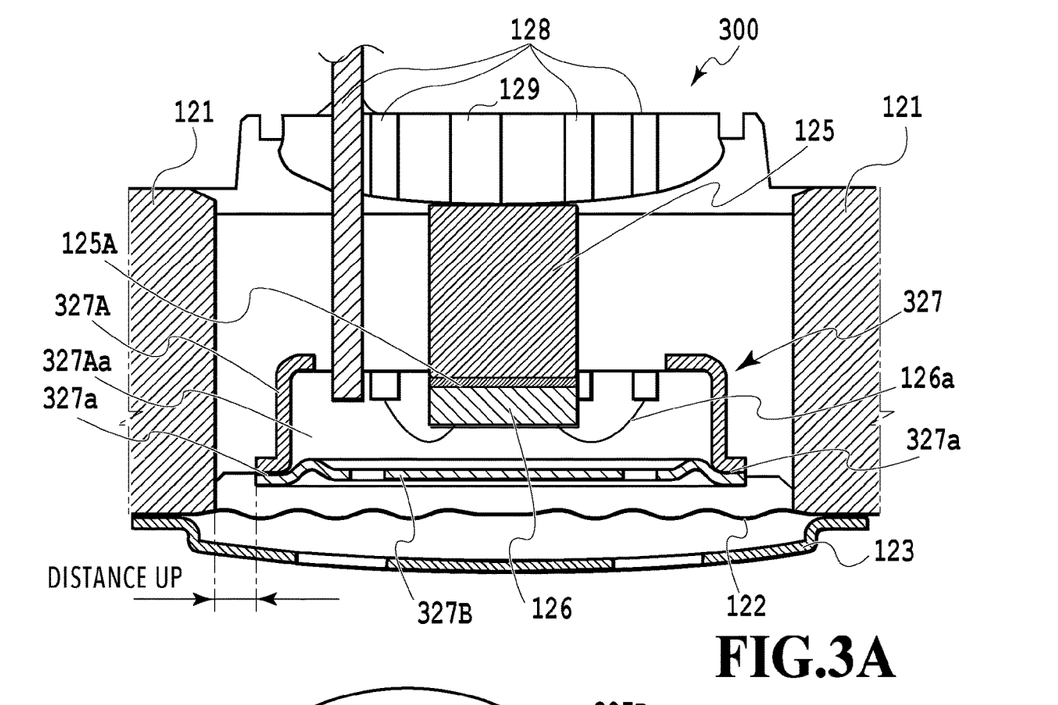
FIG. 3A is an enlarged vertical cross-sectional view illustrating a vicinity of a potential adjustment member of a liquid seal type that is a first embodiment of a pressure sensor of the present invention.
Figure 3B:
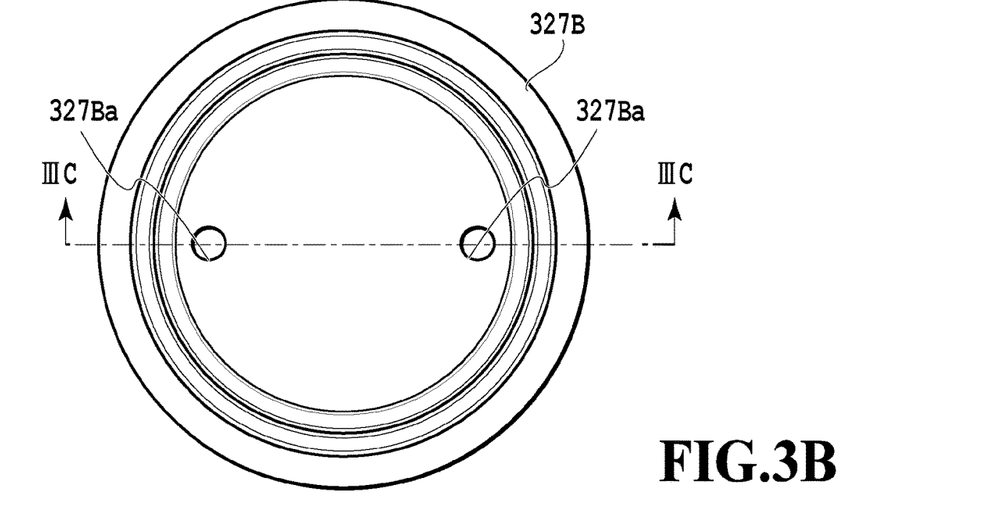
FIG. 3B is a plan view of a shield plate illustrated in FIG. 3A.

FIG. 3A is an enlarged vertical cross-sectional view illustrating a vicinity of a potential adjustment member 327 of a liquid seal type pressure sensor 300 according to the first embodiment of the pressure sensor of the present invention. FIG. 3B is a plan view of a shield plate 327B illustrated in FIG. 3A, and FIG. 3C is a cross-sectional view taken along line IIIC-IIIC illustrated in FIG. 3B.

Figure 3C:
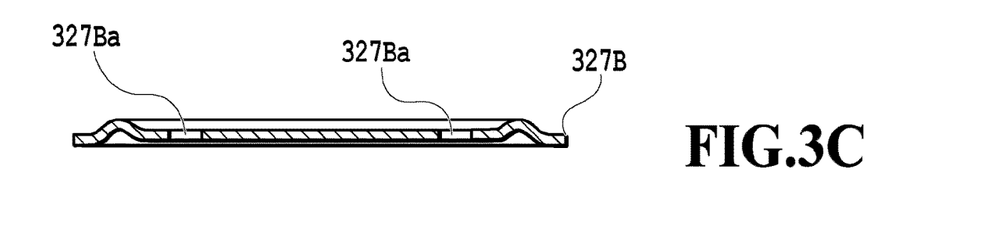
FIG. 3C is a cross-sectional view taken along line IIIC-IIIC illustrated in FIG. 3B.

The potential adjustment member 327 of the liquid seal type pressure sensor 300 in FIGS. 3A to 3C and the potential adjustment member 127 of the conventional liquid pressure type sensor 100 illustrated in FIG. 1 and FIGS. 2A to 2C are the same except that both a frame 327A and a shield plate 327B constituting the potential adjustment member 327 have reduced diameters. Similar components are denoted by similar signs and will not be described below.

As illustrated in FIGS. 3A to 3C, the frame 327A and the shield plate 327B constituting the potential adjustment member 327 have reduced diameters to increase a distance between a welding portion 327a at an outer periphery of the potential adjustment member 327 and the diaphragm 122 and the housing 121, thus making discharge less likely to occur. Note that this distance can be determined by an insulating distance calculated from voltages applied in a case of application of static electricity and in a case of application of a withstand voltage. In the present embodiment, it is sufficient that the insulating distance is longer than 0.6 mm and more preferably an insulating distance of longer than 1.0 mm provides a predetermined dielectric withstand voltage. Note that, in the present embodiment, an outer periphery of the shield plate 327B is formed at or outward of an outer periphery of the frame 327A in order to prevent inappropriate insulation resulting from formation of the outer periphery of the shield plate 327B inward of the outer periphery of the frame 327A; in a case where the shield plate 327B is brought into abutting contact with the frame 327A, burrs formed at the outer periphery of the shield plate 327B may be broken and suspended in the liquid seal chamber 124A or folded to reduce the insulating distance between the shield plate 327B and the housing 121. Furthermore, in a case where the outer periphery of the shield plate 327B is formed by half-punching-punching-out illustrated in FIGS. 6A to 6C described below, occurrence of burrs can be suppressed, allowing further effects to be obtained.

As described above, according to the pressure sensor 300 of the first embodiment of the present invention, the potential adjustment member 327 covering the pressure detection element 126 disposed inside the liquid seal chamber 124A has a modified shape with the functions of the potential adjustment member 327 unchanged, to allow prevention of the pressure detection element 126 from being damaged by discharge in a case of application of static electricity and in a case of application of a withstand voltage.

Now, a second embodiment of the present invention will be described.

Figure 4A:
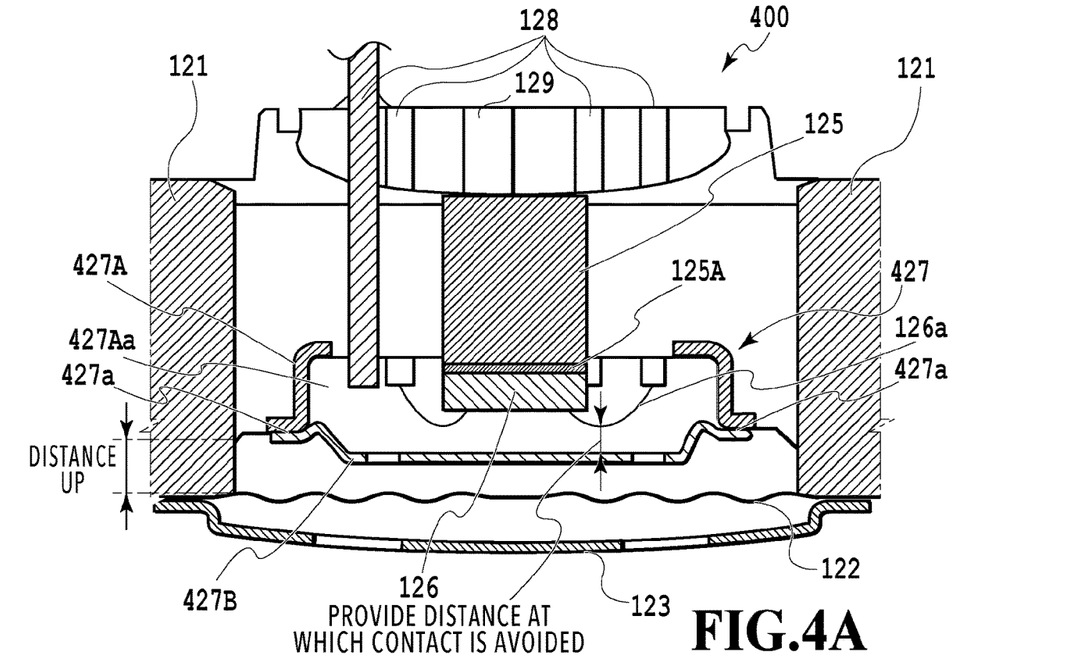
FIG. 4A is an enlarged vertical cross-sectional view illustrating a vicinity of a potential adjustment member of a liquid seal type that is a second embodiment of a pressure sensor of the present invention.
Figure 4B:
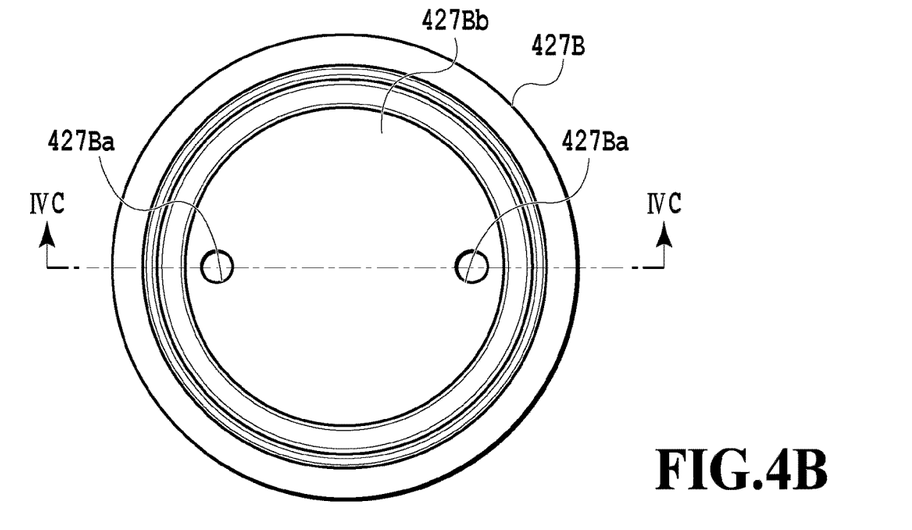
FIG. 4B is a plan view of a shield plate illustrated in FIG. 4A.

FIG. 4A is an enlarged vertical cross-sectional view illustrating a vicinity of a potential adjustment member 427 of a liquid seal type pressure sensor 400 that is the second embodiment of the pressure sensor of the present invention. FIG. 4B is a plan view of a shield plate 427B illustrated in FIG. 4A, and FIG. 4C is a cross-sectional view taken along line IVC-IVC illustrated in FIG. 4B.

Figure 4C:
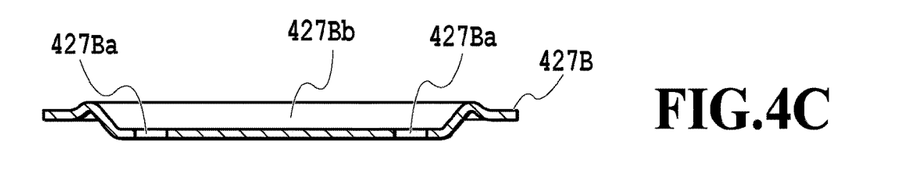
FIG. 4C is a cross-sectional view taken along line IVC-IVC illustrated in FIG. 4B.

The potential adjustment member 427 of the liquid seal type pressure sensor 400 in FIGS. 4A to 4C and the potential adjustment member 127 of the conventional liquid seal type pressure sensor 100 illustrated in FIG. 1 and FIGS. 2A to 2C are the same except that a frame 427A constituting the potential adjustment member 427 is shaped to include a recessed component 427Aa on the pressure chamber 112A side as illustrated in FIG. 4A and that a shield plate 427B is shaped to include a recessed component 427Bb on a side of the shield plate 427B facing the pressure chamber 112A as illustrated in FIG. 4C. Similar components are denoted by similar signs and will not be described below.

In a case where the welding portion 127a of the frame 127A and shield plate 127B is disposed close to the pressure chamber 112A as illustrated in FIG. 1 and FIGS. 2A to 2C, discharge is likely to occur. In contrast, the frame 427A and the shield plate 427B of the potential adjustment member 427 illustrated in FIGS. 4A to 4C have modified shapes such that a welding portion 427a is located above the pressure chamber 112A in the vertical direction, making discharge less likely to occur. Note that, in a case where a recessed component 427Aa of the frame 427A has a reduced depth and the shape of the shield plate 127B remains unmodified, the shield plate 127B is in contact with the bonding wire 126a and that, thus, here, the shield plate 427B has a modified shape so as to include a recessed component 427Bb on the side of the shield plate 427B facing the pressure chamber 112A as illustrated in FIG. 4C.

As described above, the pressure sensor 400 of the second embodiment of the present invention can also produce effects similar to the effects of the pressure sensor 300 of the first embodiment.

Now, a third embodiment of the present invention will be described.

Figure 5A:
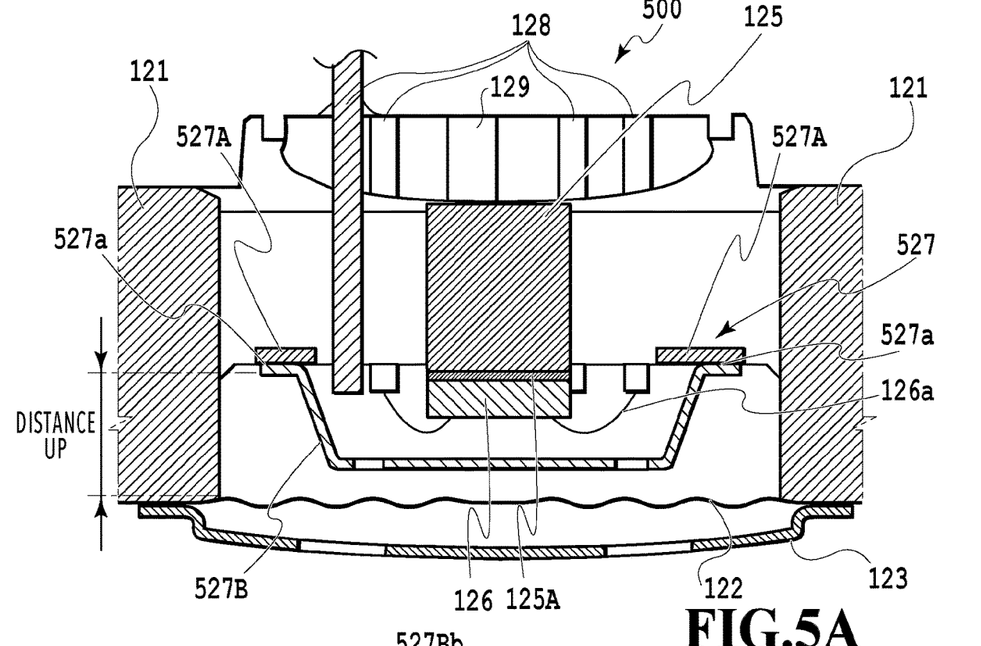
FIG. 5A is an enlarged vertical cross-sectional view illustrating a vicinity of a potential adjustment member of a liquid seal type that is a third embodiment of a pressure sensor of the present invention.
Figure 5B:
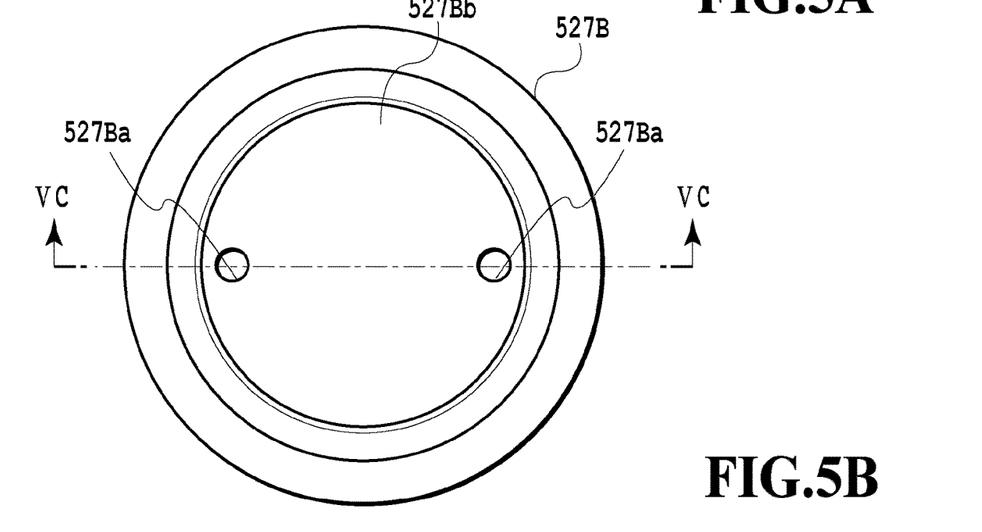
FIG. 5B is a plan view of a shield plate illustrated in FIG. 5A.

FIG. 5A is an enlarged vertical cross-sectional view illustrating a vicinity of a potential adjustment member 527 of a liquid seal type pressure sensor 500 that is the third embodiment of the pressure sensor of the present invention. FIG. 5B is a plan view of a shield plate 527B illustrated in FIG. 5A, and FIG. 5C is a cross-sectional view taken along line VC-VC illustrated in FIG. 5B.

Figure 5C:
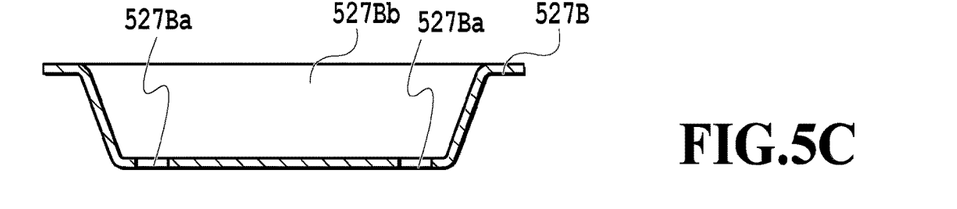
FIG. 5C is a cross-sectional view taken along line VC-VC illustrated in FIG. 5B.

The potential adjustment member 527 of the liquid seal type pressure sensor 500 in FIGS. 5A to 5C and the potential adjustment member 127 of the conventional liquid seal type pressure sensor 100 illustrated in FIG. 1 and FIGS. 2A to 2C are the same except that a frame 527A constituting the potential adjustment member 527 is shaped like a flat plate as illustrated in FIG. 5A and that a shield plate 527B is shaped to include a recessed component 527Bb on a side of the shield plate 527B facing the pressure chamber 112A as illustrated in FIG. 5C. Similar components are denoted by similar signs and will not be described below.

As illustrated in FIGS. 5A to 5C, the frame 527A of the potential adjustment member 527 and a welding portion 527a at an outer periphery of the shield plate 527B are further located higher than the frame 427A of the potential adjustment member 427 and the welding portion 427a at the outer periphery of the shield plate 427B with respect to the pressure chamber 112A. Thus, discharge is less likely to occur in the potential adjustment member 527 than in the potential adjustment member 427 illustrated in FIGS. 4A to 4C. Note that, in a case where the recessed component 527Bb of the shield plate 527B is shallow, the shield plate 527B is in contact with the bonding wire 126a and that the recessed component 527Bb formed in the shield plate 527B as illustrated in FIG. 5C is shallower than the recessed component 427Bb formed in the shield plate 427B as illustrated in FIG. 4C. Note that the frame 427A need not particularly be a frame made of metal and that any frame may be used so long as the frame is a conductive member and that the frame may be constituted of, for example, lead pins, a substrate, or the like.

As described above, the pressure sensor 500 of the third embodiment of the present invention can produce effects similar to the effects of the pressure sensor 300 of the first embodiment.

Now, a change in a method for machining an outer peripheral portion of the shield plate 327B, 427B, 527B will be described.

Figure 6A:
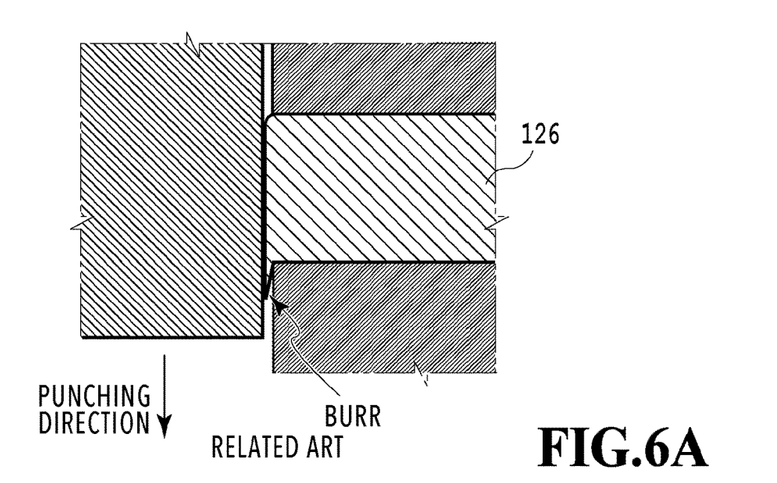
FIG. 6A is a diagram illustrating a change in a method for machining an outer peripheral portion of a shield plate and corresponding to a cross-sectional view of conventional punching.
Figure 6B:
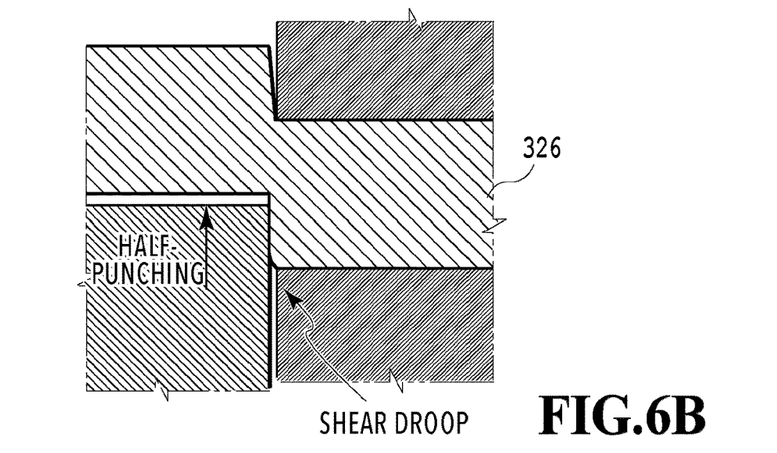
FIG. 6B is a cross-sectional view of half-punching.

FIG. 6A is a diagram illustrating a change in the method for machining the outer peripheral portion of the shield plate 327B, 427B, 527B and corresponding to a cross-sectional view of conventional punching. FIG. 6B is a cross-sectional view of half-punching, and FIG. 6C is a cross-sectional view of half-punching-punching-out.

As illustrated in FIG. 6A, for the conventional shield plate 127B, a metal flat plate is punched using a die, and the resultant plate is shaped by pressing. In conventional punching using a die, because punching direction using a die is one direction, "burrs" may be formed at the outer periphery of the shield plate 127B in a punching direction. In this case, the distance between the shield plate 127B and each of the housing 121 and the diaphragm 122 is reduced, leading to the likelihood of discharge.

Figure 6C:
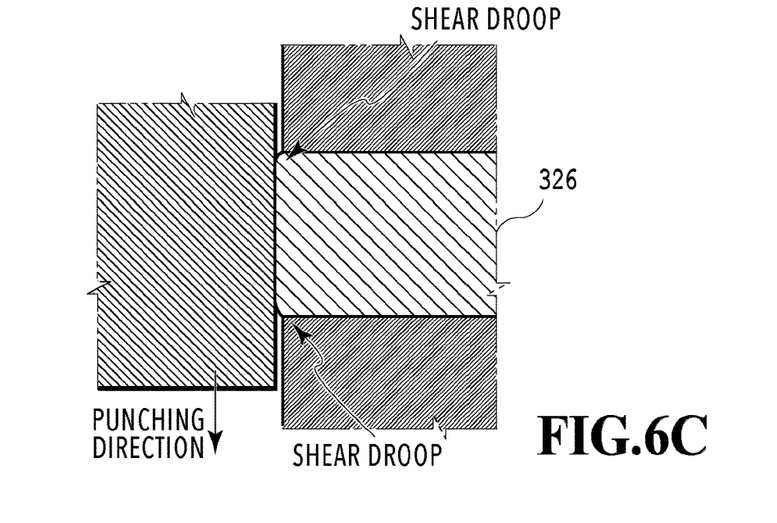
FIG. 6C is a cross-sectional view of half-punching-punching-out.

In contrast, the shield plate 327B, 427B, 527B of the present invention is subjected to half-punching-punching-out illustrated in FIG. 6B and FIG. 6C. In the half-punching-punching-out, first, half-punching is performed from a lower surface illustrated in FIG. 6B. Thus, "sheer drops" (rounded portions) are formed on a half-punched outer peripheral surface of the shield plate 327B, 427B, 527B. Then, as illustrated in FIG. 6C, punching-out is performed from an upper surface in a direction opposite to the half-punching direction illustrated in FIG. 6B. Thus, sheer droops are also formed on a punched-out outer peripheral surface of the shield plate 327B, 427B, 527B. In this manner, sheer droops are formed on opposite surfaces of the shield plate 327B, 427B, 527B to prevent "burrs" from being formed. This prevents a disadvantageous situation where the distance between the shield plate 127B and each of the housing 121 and the diaphragm 122 is reduced to make discharge likely to occur.

Note that, in the above description, the liquid seal type pressure sensors 300, 400, 500 have been described as examples of the pressure sensor of the present invention but that the present invention is not limited to this configuration and is applicable to all liquid seal type pressure sensors with other shapes.

As described above, according to the pressure sensor of the present invention, a potential adjustment member covering a pressure detection element disposed inside a liquid seal chamber has a modified shape to allow prevention of the pressure detection element from being damaged by discharge in a case of application of static electricity and in a case of application of a withstand voltage, with functions of the potential adjustment member unchanged.

REFERENCE SIGNS LIST

100 Pressure sensor
110 fluid introduction component
111 Joint member
111a Internal thread component
111b Port
112 Base plate
112A Pressure chamber
120 Pressure detection component
121 Housing
122 Diaphragm
123 Diaphragm protect cover
123a Communication hole
124 Hermetic glass
124A Liquid seal chamber
125 Pillar
125A Adhesive layer
126 Pressure detection element
126a Bonding wire
127, 327, 427, 527 Potential adjustment member
127A, 327A, 427A, 527A Frame
127Aa, 327Aa, 427Aa Recessed component
127B, 327B, 427B, 527B Shield plate
127Ba, 327Ba, 427Ba, 527Ba Communication hole
128 Lead pin
129 Oil filling pipe
130 Signal transmission component
131 Terminal block
132 Connection terminal
132a Adhesive
133 Electric wire
133a Core wire
134 Electrostatic protect layer
134a Adhesive layer
134b Coating layer
134c Portion
140 Cover member
141 Waterproof case
142 Terminal block cap
143 Sealing agent
427Bb, 527Bb Recessed component

The invention claimed is:

1. A pressure sensor comprising:
a diaphragm made of metal and configured to separate a pressure chamber into which a fluid with a pressure thereof to be detected is introduced from a liquid seal chamber filled with sealing oil;
a housing made of metal and disposed around the liquid seal chamber;
a pressure detection element disposed in the liquid seal chamber in a liquid sealable manner to detect the pressure of the fluid via the diaphragm and the sealing oil; and
a potential adjustment member disposed between the pressure detection element and the diaphragm, the potential adjustment member being disposed between the pressure detection element and the housing, the potential adjustment member being conductive, the potential adjustment member being connected to a zero potential terminal of the pressure detection element, wherein
a first distance between the potential adjustment member and the diaphragm and a second distance between the potential adjustment member and the housing are both larger than a predetermined insulating distance, the predetermined insulating distance being about 0.6 mm or more.

2. The pressure sensor according to claim 1, wherein the predetermined insulating distance is about 1.0 mm or more.

3. The pressure sensor according to claim 1, wherein the potential adjustment member comprises a frame made of metal and connected to a zero potential of the pressure detection element; and
a shield plate made of metal and disposed between the diaphragm and the pressure detection element.

4. The pressure sensor according to claim 3, wherein the frame is shaped to include a recessed component on the pressure chamber side, and
the shield plate is shaped like a flat plate.

5. The pressure sensor according to claim 3, wherein the frame is shaped to include a recessed component on the pressure chamber side, and
the shield plate is shaped to include a recessed component on a side of the shield plate facing the pressure chamber.

6. The pressure sensor according to claim 3, wherein the frame is shaped like a flat plate, and
the shield plate is shaped to include a recessed component on a side of the shield plate facing the pressure chamber.

7. The pressure sensor according to claim 3, wherein an outer periphery of the shield plate is formed at or outward of the outer periphery of the frame.

8. The pressure sensor according to claim 3, wherein an outer periphery of the shield plate is formed by half-punching-punching-out.

9. The pressure sensor according to claim 8, wherein the frame is fixed to hermetic glass disposed around the liquid seal chamber, and
the frame and the shield plate are connected together by welding so as to cover the pressure detection element disposed inside the liquid seal chamber.

* * * * *